United States Patent [19]
Ku

[11] Patent Number: 5,975,691
[45] Date of Patent: Nov. 2, 1999

[54] STRUCTURE OF DETACHABLE AUXILIARY LENSES WITH MAGNETS

[76] Inventor: Kuo-Sheng Ku, No. 201, Kuo An Street, Tainan, Taiwan

[21] Appl. No.: 09/140,768

[22] Filed: Aug. 26, 1998

[51] Int. Cl.⁶ .................... G02C 9/00; G02C 7/08
[52] U.S. Cl. ............................................. 351/47; 351/57
[58] Field of Search .................... 351/44, 47, 116, 351/121, 57

[56] References Cited

U.S. PATENT DOCUMENTS 5,642,177  6/1997  Nishioka ............................ 351/47

Primary Examiner—Huy Mai
Attorney, Agent, or Firm—Rosenberg, Klein & Bilker

[57] ABSTRACT

A detachable auxiliary sunglasses with magnets are provided, including a rim, sunglasses lenses mounted within the rim, and two magnets each pivoted to a respective endpiece of the rim. The auxiliary sunglasses can be secured to a primary eyeglasses, which have two magnets in positions corresponding to the positions of the magnets of auxiliary sunglasses, by means of a bond between the magnets attracting each other. The magnets are pivoted to the endpieces of the auxiliary sunglasses are capable of turning according to the position of the magnets of the primary eyeglasses so as to maintain a close contact with the same when distance between two temples of the primary eyeglasses broadens when wearing the eyeglasses.

1 Claim, 7 Drawing Sheets

STRUCTURE OF DETACHABLE AUXILIARY LENSES WITH MAGNETS

BACKGROUND OF THE INVENTION

1. Field of the Invention

The present invention relates in general to eyeglasses and auxiliary lenses capable of being detachably coupled to eyeglasses. More particularly, the present invention relates to means with which auxiliary lenses are attached to eyeglasses. And still more particularly, the present invention proposes a structure for the auxiliary lenses to form a secure connection when attached to the eyeglasses, without worry of falling apart from the eyeglasses due to slight change of shape of the frame of the eyeglasses when the eyeglasses fit on a human wearer's head.

2. Description of the Related Art

In the past various means have been utilized to secure auxiliary lenses to eyeglasses. One of them is clipping device, which is permanently attached to the auxiliary lenses. The clipping device fits around the frames of the eyeglasses to clip the auxiliary lenses to the eyeglasses. However, the clipping devices the eyeglasses look unattractive.

Another means for securing auxiliary lenses to eyeglasses is to use magnetic material. This is currently a popular way to secure auxiliary lenses to eyeglasses, and several devices have been proposed and patented, including Magnetic Means For Securing Auxiliary Lenses To Eyeglasses, patented by U.S. Patent and Trademark Office with U.S. Pat. No. 5,116,537, and Detachable Sunglasses With Magnets, also patented by U.S. Patent and Trademark Office with U.S. Pat. No. 5,642,177.

According to the above mentioned patents, U.S. Pat. Nos. 5,416,537 and 5,642,177, referring to FIGS. 6 and 7, magnets 101 are fixed to two end portions of rim 10 of the eyeglasses while magnets 201 are fixed to two end portions of rim 20 of the templeless auxiliary sunglasses; thus, the templeless auxiliary sunglasses can be secured to the eyeglasses by means of the magnets 201, 101 attracting each other to form a bond.

Another device proposed for the same purpose is a patent application with PCT, with application number WO 90/09611. Referring to FIG. 8, a magnet 302 is provided on bridge 301 of rim 30 of the eyeglasses while a second magnet 402 is mounted on bridge 401 of rim 40 of the templeless sunglasses; thus the templeless sunglasses can be secured to the eyeglasses by means of the magnets 402,302 attracting each other to form a bond.

However, through experience, it is found that the temples of the eyeglasses would broaden when fitting on a wearer's head, causing the end portions of the rim to angularly turn. The turning of the end portions of the rim would change the position of the magnets mounted thereon, resulting in loss of close contact between the magnets of the templeless sunglasses and the magnets of the eyeglasses and consequently the sunglasses fall from the eyeglasses under extreme conditions.

As for the sunglasses with magnets mounted on the bridge, the bond is found to be too weak and the sunglasses would easily turn at an angle from the desired position.

To overcome the disadvantages of the above mentioned means, other means have been proposed, including U.S. Patents Auxiliary Lenses For Eyeglasses, U.S. Pat. Nos. 5,568,207 and 5,737,054.

According to U.S. Pat. No. 5,568,207, referring to FIG. 10, magnets 503 are mounted on endpieces 502 of rim 50 of the eyeglasses, the endpieces 502 being provided to connect temples 501. Second magnets 602 are mounted on supporting end portions 601 of templeless sunglasses 60 so that the templeless sunglasses 60 can be secured to the eyeglasses by means of the bond between the magnets 503 and 602, the supporting end portions 601 resting on the endpieces 502 of the rim 50 to provide a stable support for the tempteless sunglasses 60, as shown in FIG. 11.

As for U.S. Pat. No. 5,737,054, Auxiliary Lenses For Eyeglasses, referring to FIG. 12, a magnet 702 is mounted on a bridge 701 of the eyeglasses 70 while a second magnet 803 is mounted on bottom portion of a protrusion 802 provided above a bridge of the templeless eyeglasses 80; thus, the templeless sunglasses can be secured to the eyeglasses by means of bond between the magnets 803 and 702 attracting each other.

Moreover, the inventor of the present invention proposed a means for securing auxiliary lenses to eyeglasses, which was filed at U.S. Patent and Trademark Office on Oct. 28, 1997 with application Ser. No. 08/959,486 referring to FIG. 13, magnets 901 are mounted on endpieces 902 of eyeglasses 90 in a way that recesses 903 are formed on the endpieces 902. A templeless eyeglasses 905 is provided, having extending portions 906 at two ends and magnets 904 mounted on the extending portions 906 in a way that the magnets 904 each forms a protrusion; thus, the templeless sunglasses 905 can be coupled to the eyeglasses by means of bond between the magnets 901 and 904 attracting each other, with the recesses 903 retaining the magnets 904 to strengthen the bond, as shown in FIG. 14.

The above mentioned three means provide a stabler and more secure connection between the eyeglasses and the templeless sunglasses, however the wearer has to put on the templeless sunglasses from above the eyeglasses fittings on his/her head due to presence of the extending portions 906 in FIG. 13, the protrusion 802 in FIG. 12, and the supporting end portions 601 in FIGS. 10 and 11. This is different from the way the wearer is used to when putting on the templeless sunglasses, i.e. from ahead of the eyeglasses. So it is not very convenient in using securing means of this kind.

SUMMARY

A detachable auxiliary sunglasses with magnets of the present invention is devised to be capable of detachably fitting on a primary eyeglasses. The auxiliary sunglasses are templeless and the magnets are mounted on turning members of the sunglasses at two end portions of the rim, the turning members being capable of pivotting on the end portions.

The auxiliary sunglasses provides a protection to a wearer from vision-damaging elements of sunlight when fitting on a primary eyeglasses worn by the wearer; the primary eyeglasses have magnets in positions corresponding to the positions of the magnets of the auxiliary sunglasses so that the sunglasses can be secured to the primary eyeglasses by means of bond between the magnets attracting each other.

The magnets of the auxiliary sunglasses, being capable of pivoting on the end portions along with the turning members, can maintain a stable and close contact with magnets of the primary eyeglasses even if position of the magnets of the primary eyeglasses changes for an angle due to change of shape of the primary eyeglasses through wearing

BRIEF DESCRIPTION OF THE DRAWINGS

The present invention will be better understood with reference to the accompanying drawings, wherein.

DETAILED DESCRIPTION OF THE PREFERRED EMBODIMENTS

Figure 1:
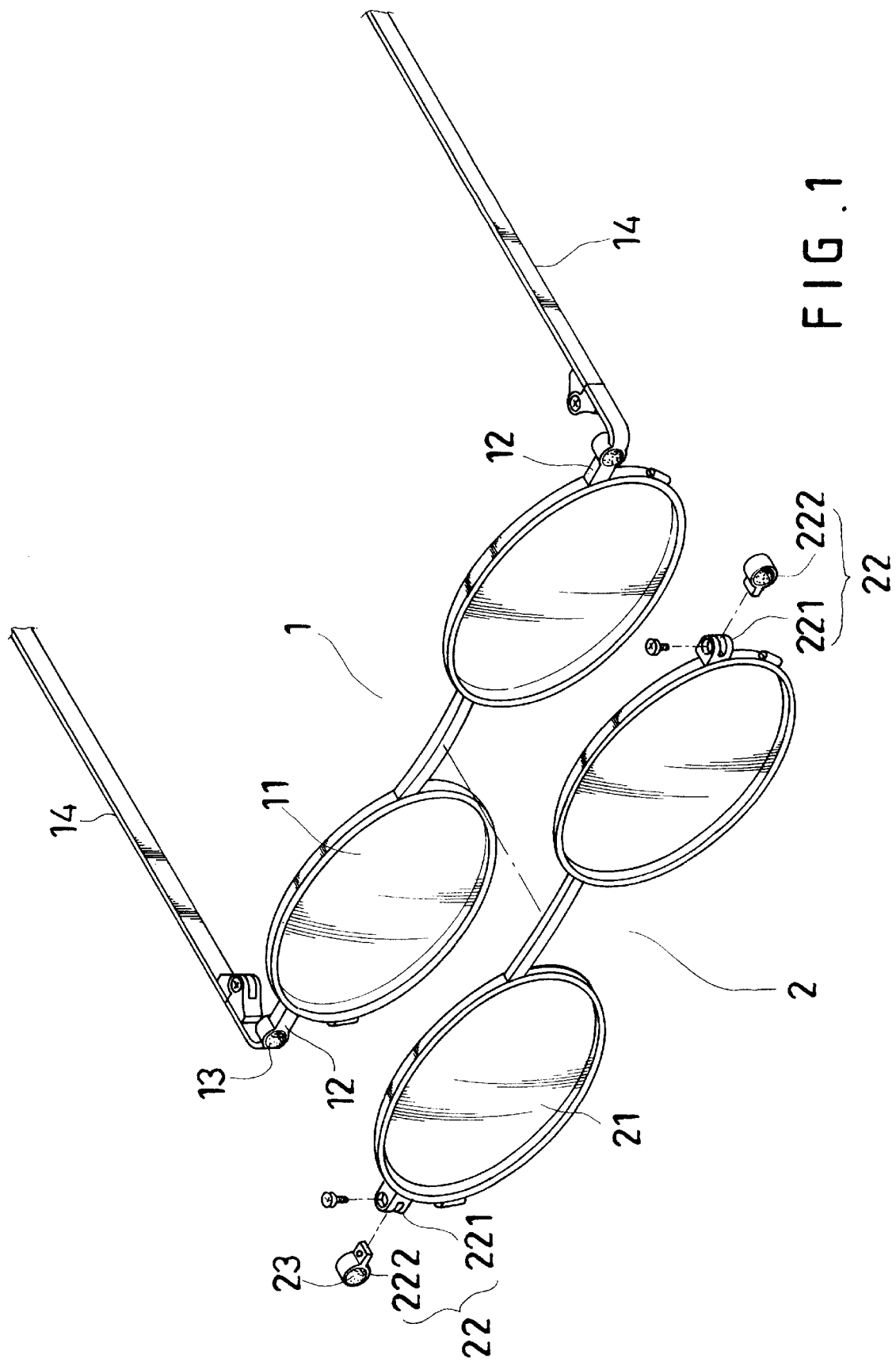
FIG. 1 is an exploded perspective view of an detachable auxiliary lenses and an associated eyeglasses of the present invention.
Figure 2:
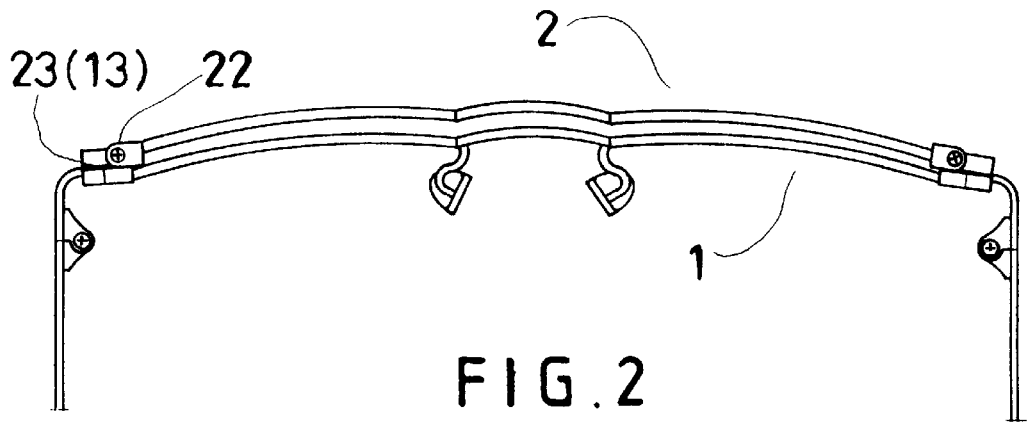
FIG. 2 is a top view of the detachable auxiliary lenses coupled to an associated eyeglasses according to the present invention.
Figure 5:
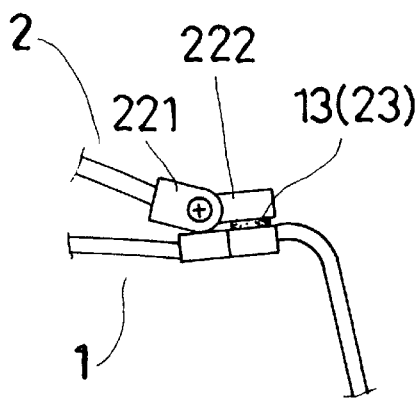
FIG. 5 is an enlarged fragmentary view of FIG. 4.
Figure 3:
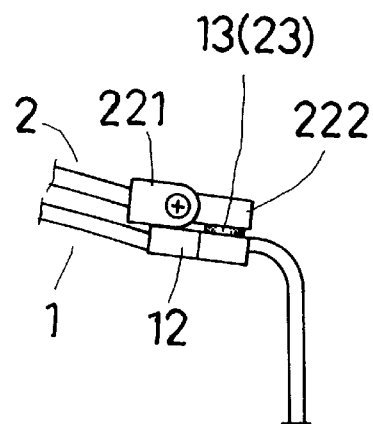
FIG. 3 is a top view of a hinge of the detachable auxiliary lenses of the present invention, with the magnet thereon secured to a respective magnet of the associated eyeglasses.
Figure 4:
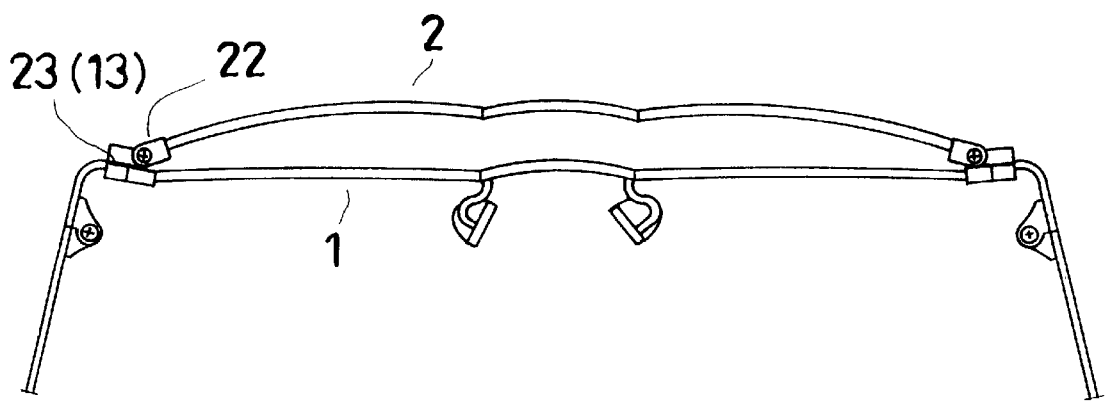
FIG. 4 is a top view showing the detachable auxiliary lenses of the present invention under change of position of the temple of the associated eyeglasses.
Figure 12:
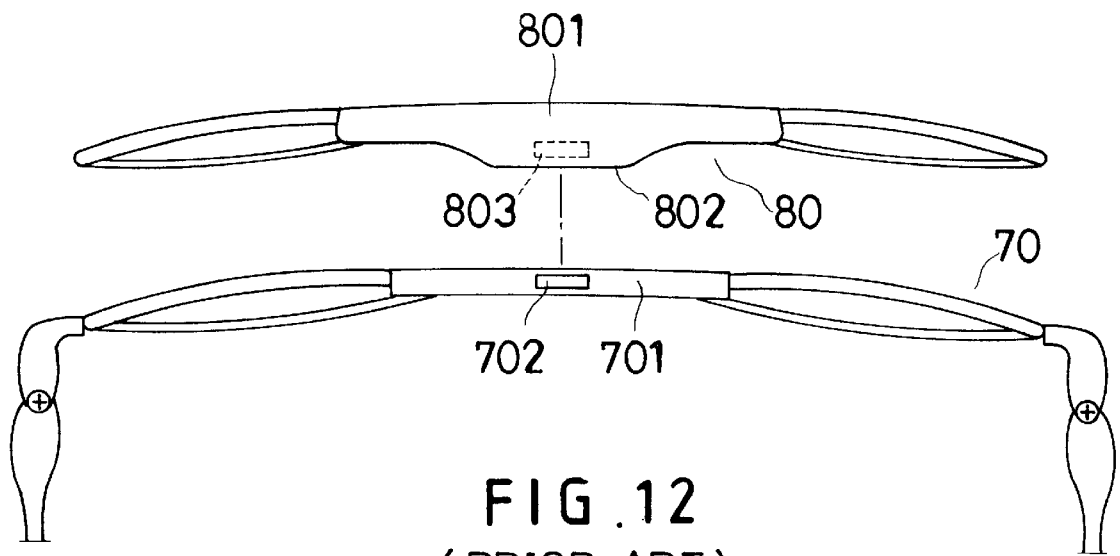
FIG. 12 is a top view of a fifth heretofore known auxiliary lenses and the associated eyeglasses as described in the Background.
Figure 8:
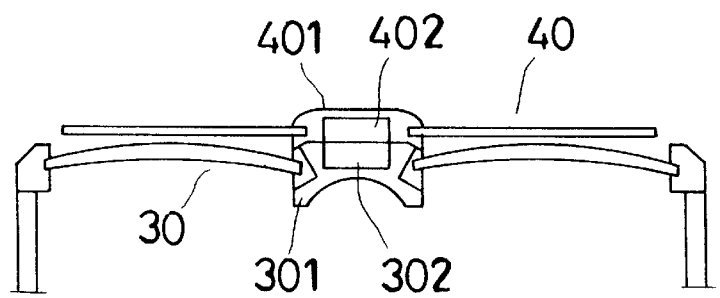
FIG. 8 is a top view of a third heretofore known auxiliary lenses and the associated eyeglasses as described in the Background.
Figure 6:
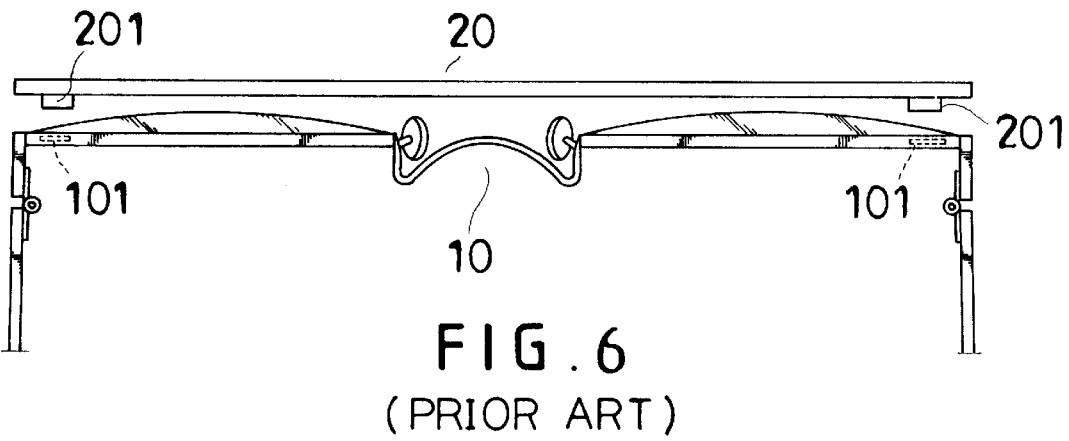
FIG. 6 is a top view of a heretofore known auxiliary lenses and the associated eyeglasses as described in the Background.
Figure 7:
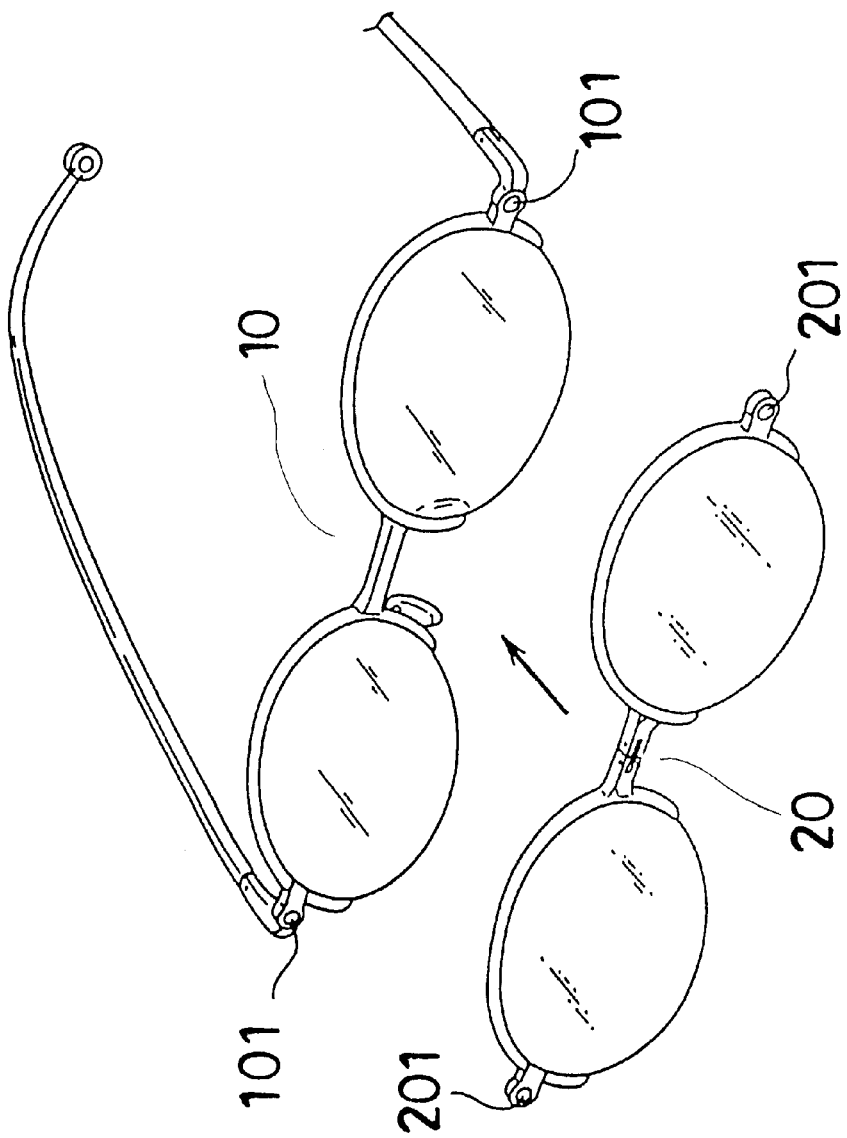
FIG. 7 is a perspective view of heretofore known auxiliary lenses and the associated eyeglasses as described in the Background.
Figure 14:
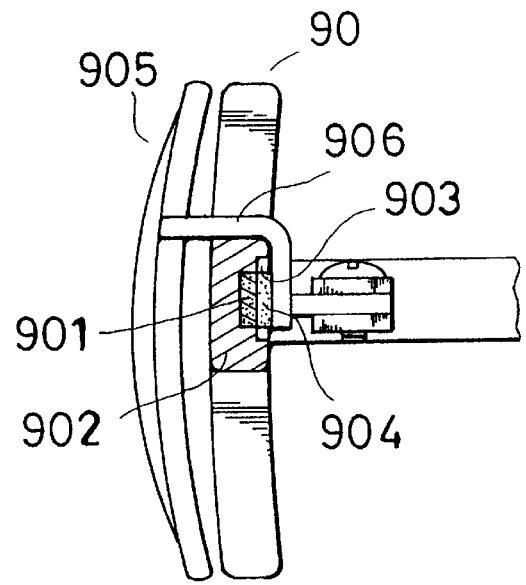
Figure 9:
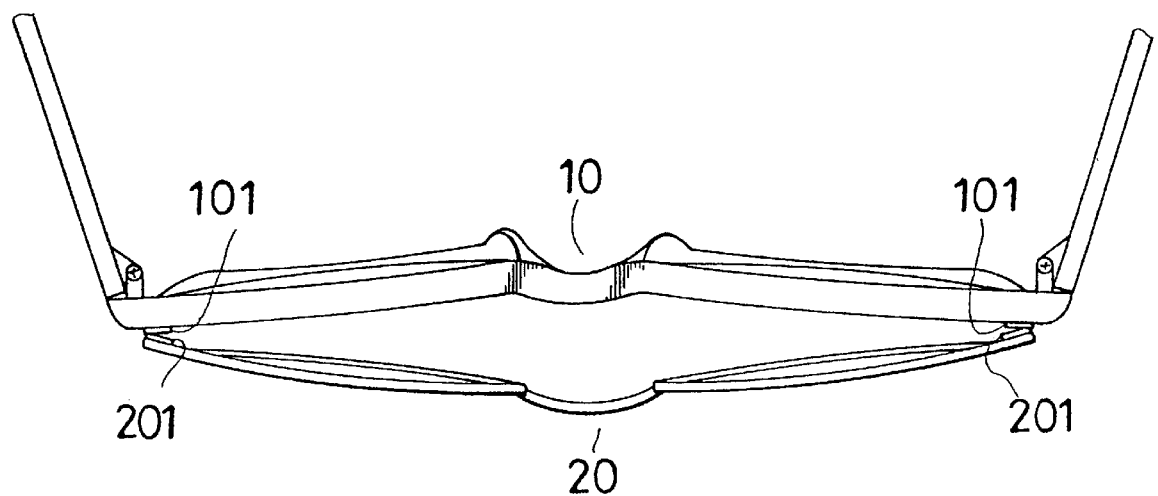
FIG. 9 is a top view showing the connection between the auxiliary lenses and its associated eyeglasses when distance between the temples are broadened.
Figure 10:
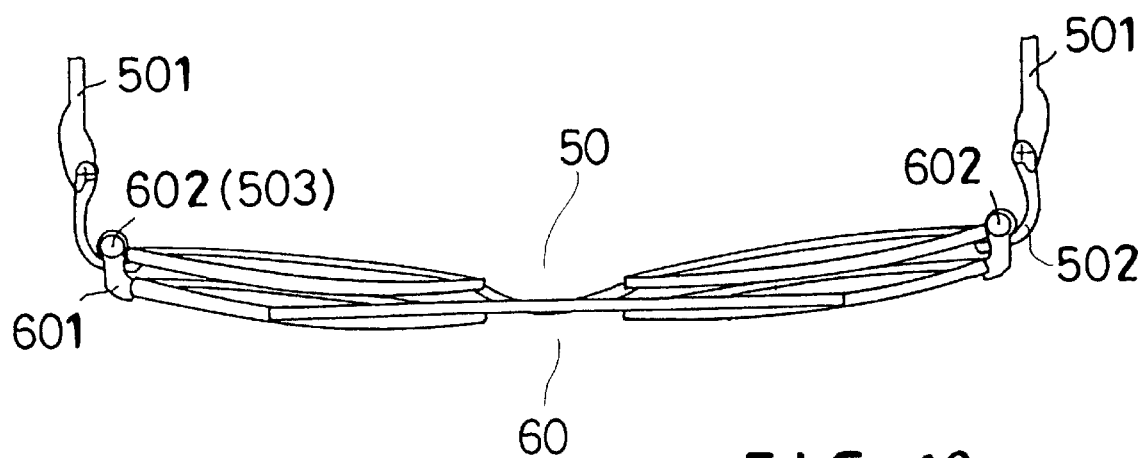
FIG. 10 is a top view of a fourth heretofore known auxiliary lenses and the associated eyeglasses as described in the Background.
Figure 11:
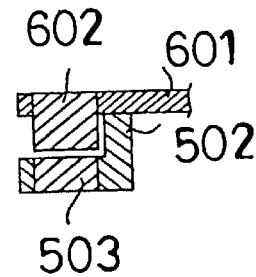
FIG. 11 is an enlarged fragmentary section view of FIG. 10.
Figure 13:
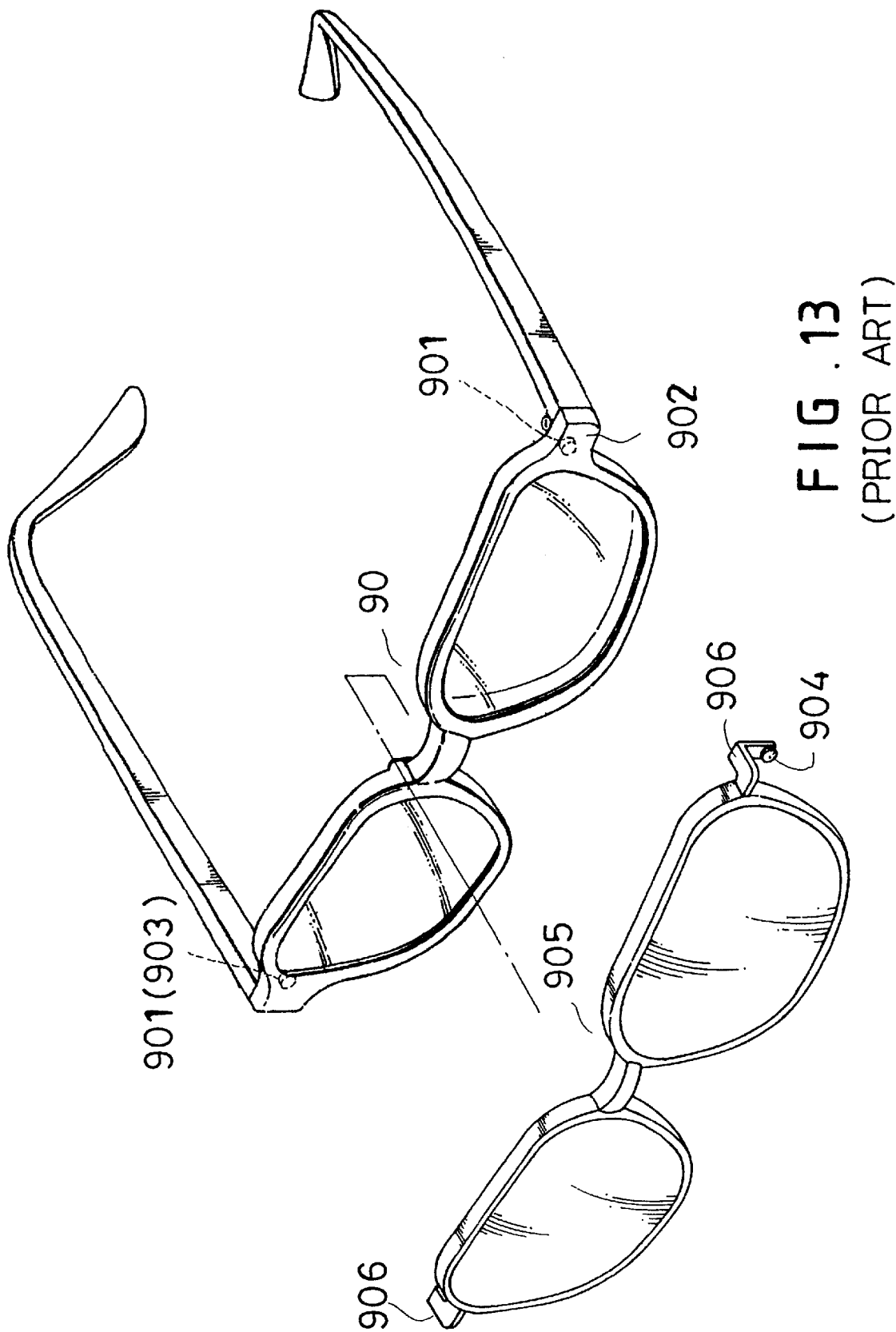
FIG. 13 is a perspective of a sixth heretofore known auxiliary lenses and the associated eyeglasses as described in the Background; and, FIG. 14 is a section view of the sixth auxiliary lenses and associated eyeglasses of FIG. 13.

A detachable auxiliary lenses with magnets of the present invention, referring to FIG. 1, includes a rim 2, sunglasses 21 mounted within the rim 2, endpieces 221 at two end portions of the rim 2, which endpieces 221 are formed such that they can be each pivotally connected with a respective turning member 222 to form a hinge (denoted with numeral 22 as a whole). A magnet 23 is mounted within a respective turning member 222.

A pair eyeglasses are provided, including a rim 1, lenses 11 mounted within the rim 1, connecting portions 12 at two end portions of the rim 1, magnets 13 each mounted on a respective one of the connecting portions 12, and temples 14 pivotally connected to the connecting portions 12; magnets 23 of the templeless sunglasses are arranged in positions corresponding with positions of the magnets 13 of the eyeglasses. Thus, the templeless auxiliary sunglasses can be secured to the eyeglasses by a bond between the magnets 13 and 23 attracting each other. Moreover, the hinges 22 at two end portions of the sunglasses permit the turning members 222, within which the magnets 23 are mounted, to turn according to the position of the magnets 13 connected with the magnets 23. Thus, when a wearer put on the eyeglasses with the auxiliary sunglasses coupled thereto, the auxiliary sunglasses can be firmly secured to the eyeglasses even if the magnets 13 turn at an angle due to broadening of the distance between the temples 14 when the eyeglasses fit on a wearer's head.

From the above description, it can be understood that the magnets 23 pivotally connected to the auxiliary sunglasses can always have close contact with the magnets 13 of the eyeglasses, no matter how the position of the magnets 13 chance due to wearing. Furthermore, the auxiliary sunglasses can be put on the eyeglasses from ahead of the sunglasses worn on the user's head, preserving a very convenient way of wearing.

What is claimed is:

1. A pair of eyeglasses having detachable auxiliary lenses, comprising:

a first pair of eyeglasses, said first pair of eyeglasses including:
    a first frame having two opposite ends,
    a pair of first lenses installed within and supported by said first frame,
    a pair of connecting portions, each immovably fastened at a respective one of said two opposite ends of said first frame,
    a pair of first magnets, each of said first magnets being embedded within a respective one of said connecting portions, and
    a pair of temples, each hingedly coupled to a respective one of said connecting portions; and an auxiliary pair of eyeglasses removably attachable to said first pair of eyeglasses, said auxiliary pair of eyeglasses including:
    a second frame having two opposite ends,
    a pair of second lenses installed within and supported by said second frame,
    a pair of endpieces respectively secured to said two opposite ends of said second frame,
    a pair of turning members, each of said turning members being pivotally coupled to a respective one of said pair of end pieces, and
    a pair of second magnets, each of said second magnets being embedded within a respective one of said pair of turning members, each of said second magnets being disposed in aligned relationship with a respective one of said first magnets of said first pair of eyeglasses and poled for attraction therebetween to removably attach said pair of auxiliary eyeglasses to said first pair of eyeglasses, said pivotal coupling of said turning members substantially maintaining said alignment between said first and second magnets during distortion of said first frame occurring when said first pair of eyeglasses are worn by a user.

* * * * *